(12) United States Patent
Inoko (10) Patent No.: US 12,502,620 B2
(45) Date of Patent: Dec. 23, 2025

(54) PRESENTATION SYSTEM AND PRESENTATION METHOD

(71) Applicant: TEAMLAB INC., Tokyo (JP)

(72) Inventor: Toshiyuki Inoko, Tokyo (JP)

(73) Assignee: TeamLab Inc., Tokyo (JP)

( * ) Notice: Subject to any disclaimer, the term of this patent is extended or adjusted under 35 U.S.C. 154(b) by 629 days.

(21) Appl. No.: 17/919,745

(22) PCT Filed: Mar. 17, 2021

(86) PCT No.: PCT/JP2021/010889
§ 371 (c)(1),
(2) Date: Oct. 18, 2022

(87) PCT Pub. No.: WO2021/215150
PCT Pub. Date: Oct. 28, 2021

(65) Prior Publication Data
US 2023/0166198 A1    Jun. 1, 2023

(30) Foreign Application Priority Data

Apr. 20, 2020 (JP) ................... 2020-075059

(51) Int. Cl.
*A63J 5/02* (2006.01)
*A63H 33/28* (2006.01)
*G03B 21/608* (2014.01)

(52) U.S. Cl.
CPC ............ *A63J 5/025* (2013.01); *G03B 21/608* (2013.01); *A63H 33/28* (2013.01)

(58) Field of Classification Search
CPC ........ A63H 33/28; A63J 5/025; G03B 21/608
See application file for complete search history.

(56) References Cited

U.S. PATENT DOCUMENTS 3,589,044 A * 6/1971 Morrison ............... G09B 23/12
40/407
3,744,220 A * 7/1973 Klein ....................... B04C 5/04
96/372
(Continued)

FOREIGN PATENT DOCUMENTS

CN          203989893 U    12/2014
CN          105597345 A     5/2016
(Continued)

OTHER PUBLICATIONS

Extended European search report of European application No. 21793075.9 (10 pages).

(Continued)

*Primary Examiner* — Magdalena Topolski
(74) *Attorney, Agent, or Firm* — Pyprus Pte Ltd; George Liu (57) ABSTRACT

The presentation system 100 comprises: a tornado fan in which a plurality of blowers each perform blowing so that clockwise or counterclockwise air flow is generated in a presentation space surrounded by exhaust ports 114 of the plurality of blowers when viewed in a plan view; and a supply device 12 that supplies a float body such as a bubble into the presentation space. It is possible to cause an aggregate of bubbles to float in the vicinity of the center in the presentation space by means of a vortex air flow formed in the presentation space.

8 Claims, 5 Drawing Sheets

(56) References Cited

U.S. PATENT DOCUMENTS

| | | | | |
|---|---|---|---|---|
| 4,258,912 | A | * | 3/1981 | Reighart ................ A63H 33/28 |
| | | | | 472/65 |
| 4,452,562 | A | * | 6/1984 | Hsu .......................... F03D 1/04 |
| | | | | 415/908 |
| 5,096,467 | A | | 3/1992 | Matsui |
| 5,272,604 | A | * | 12/1993 | Lin ....................... F21S 10/002 |
| | | | | 40/406 |
| 5,322,646 | A | * | 6/1994 | Wright ...................... F24F 6/12 |
| | | | | 261/79.2 |
| 5,971,765 | A | * | 10/1999 | Gill ........................ G09B 23/12 |
| | | | | 95/271 |
| 6,254,489 | B1 | | 7/2001 | Drobnis et al. |
| 6,835,128 | B1 | * | 12/2004 | Olson .................... F24F 13/28 |
| | | | | 454/232 |
| 9,821,596 | B2 | * | 11/2017 | Wurtzel ................... G09F 19/00 |
| 11,446,584 | B2 | * | 9/2022 | Yang ...................... A63H 33/28 |
| 12,172,098 | B2 | * | 12/2024 | Chan ..................... A63H 33/28 |
| 2016/0206969 | A1 | | 7/2016 | Kyono et al. |
| 2024/0139644 | A1 | * | 5/2024 | Inoko ..................... A63G 31/00 |

FOREIGN PATENT DOCUMENTS

| | | | | | |
|---|---|---|---|---|---|
| EP | 2920647 | B1 | | 1/2019 | |
| JP | H01159558 | A | * | 6/1989 | |
| JP | 03279732 | A | * | 12/1991 | |
| JP | 1996-287709 | A1 | | 11/1996 | |
| JP | WO2015/033477 | A1 | | 3/2015 | |
| JP | 2018-200393 | A1 | | 12/2018 | |
| KR | 970016365 | A | * | 4/1997 | .............. F24F 3/167 |
| KR | 20210047123 | A | * | 4/2021 | .............. F24F 7/007 |

OTHER PUBLICATIONS

International Search Report of International Patent Application No. PCT/JP2021/010889 completed on Jun. 7, 2021 and mailed Jun. 15, 2021 (4 pages).

Written Opinion of International Patent Application No. PCT/JP2021/010889 completed on Jun. 7, 2021 and mailed Jun. 15, 2021 (4 pages).

1st Office Action for Chinese patent application No. 202180024681.3 dated Dec. 18, 2024 (6 pages).

2nd Office Action for Chinese patent application No. 202180024681.3 dated Jun. 23, 2025 (6 pages).

* cited by examiner

PRESENTATION SYSTEM AND PRESENTATION METHOD

TECHNICAL FIELD

The present invention relates to a presentation system and a presentation method allowing a float body such as an aggregate of bubbles to float in midair.

BACKGROUND ART

Conventionally, as a device to perform a predetermined presentation using bubbles, there has been known, for example, a soap bubble illumination device disclosed in Patent Document 1 and a bubble projection mapping system disclosed in Patent Document 2.

The soap bubble illumination device of Patent Document 1 includes a container that stores a soap liquid, soap bubble generating means for generating soap bubbles by blowing a gas to the soap liquid in the container, and a light source that irradiates the soap bubbles generated in the container with a light. Thus, in Patent Document 1, by lighting the light source to irradiate the soap bubbles with the light, the light is diffused by the soap bubbles and a tender light is emitted, thereby allowing providing a visually beautiful atmosphere as a display.

The bubble projection mapping system of Patent Document 2 includes a bubble detecting device that detects at least one of a position and a range where a bubble body is present, and an image projecting device that projects an image on the detected bubble body. In this system, it is proposed to encourage children and the like to earnestly wash their hands by projecting, for example, a message encouraging washing fingers using the bubble body as a projection image.

Patent Document 1: JP-A-H8-287709
Patent Document 2: JP-A-2018-200393

DISCLOSURE OF THE INVENTION

Problems to be Solved by the Invention

Now, the devices disclosed in Patent Document 1 and Patent Document 2 both assume to project the light and the image in the state where the bubbles are in contact with the container and the human fingers, and the characteristics of the bubble having a light mass and being floatable are not sufficiently utilized. Therefore, it is a main object of the present invention to provide innovative presentation system and presentation method that effectively use characteristics of a float body such as a bubble.

Solutions to the Problems

A first aspect of the present invention relates to a presentation system. The presentation system according to the present invention includes a tornado fan and a supply device of a float body. The tornado fan is a system established to include a plurality of blowers. The tornado fan has a configuration in which each of the plurality of blowers blows air such that a clockwise or counterclockwise vortex air flow is generated in plan view in a presentation space surrounded by exhaust ports of the plurality of blowers. The number of the blowers included in the tornado fan only needs to be two or more, and three or more or four or more is preferable. For example, when the number of the blowers is two, the vortex air flow can be generated in the presentation space by disposing the exhaust ports such that the air discharged from the respective exhaust ports pass each other. For example, when the number of the blowers is four, the vortex air flow can be generated in the presentation space by disposing the exhaust ports of the blowers at four corners of the presentation space to discharge the air clockwise or counterclockwise from each exhaust port. The supply device supplies a float body in the presentation space in which the vortex air flow has been generated as described above. The "float body" is an object that floats on the air flow and has a property (temporariness) of disappearing over time (including becoming invisible to human). While examples of the float body include a bubble, a mist (fog), water vapor, a cloud, and a smoke, the float body is not limited to them. In the present invention, the supply device is especially preferably a bubble pump that supplies bubbles in the presentation space. Thus, in the present invention, a float body (for example, aggregate of bubbles) is formed in the proximity of the center of the presentation space by the vortex air flow. Floating the float body is also allowed.

The presentation system according to the present invention preferably further includes one or a plurality of suction ports in an upper side of the presentation space, and the suction ports suction the air blown by each blower of the tornado fan. Thus, by disposing the suction port in the upper side of the presentation space, a tornado-like rising air flow can be generated in the presentation space. Accordingly, the floating state of the float body can be easily kept.

In the presentation system according to the present invention, each of air intake ports of the plurality of blowers is preferably disposed at a peripheral area of the suction port. Thus, by disposing the air intake ports of the blowers at the peripheral area of the suction port in the upper side of the presentation space, approximately the whole amount of the air discharged from the exhaust ports of the blowers can be suctioned from the air intake ports of the blowers. Accordingly, since the air volume supplied in the presentation space is approximately the same as the air volume discharged from the presentation space, the float body is easily remained in the presentation space while keeping the floating state of the float body (for example, aggregate of bubbles).

The presentation system according to the present invention preferably further includes a ceiling fan. The ceiling fan includes an exhaust port disposed in an upper side of the presentation space, and blows the air from the exhaust port toward the suction port. Thus, by disposing the ceiling fan separately from the tornado fan and blowing air toward the suction port, the stability of the tornado-like rising air flow can be broken in the proximity of the suction port. Accordingly, suctioning the float body in the suction port can be suppressed.

The presentation system according to the present invention preferably further includes a floor fan. The floor fan includes an exhaust port in a proximity of a floor surface of the presentation space, and blow the air from the exhaust port in a direction along the floor surface. For example, the exhaust port of the floor fan is preferably disposed at a height within 1 m from the floor surface. Thus, by disposing the floor fan separately from the tornado fan, grounding of the float body on the floor surface can be suppressed by the wind flowing along the floor surface. Accordingly, the floating state of the float body can be easily kept.

In the presentation system according to the present invention, the supply device may be a mist atomizer that supplies a mist in the presentation space. In this case, the mist can be treated as the float body. The above-described bubble pump and the mist atomizer can be used in combination. In this case, the mist is used to increase the humidity inside the presentation space. That is, by supplying the mist in the presentation space to increase the humidity inside the presentation space, the sustainability of the bubbles supplied from the bubble pump can be enhanced.

The presentation system according to the present invention preferably further includes a sensor and a controller. The sensor senses both or any one of a state of the presentation space and a state of the float body. An example of the sensor is an optical sensor (for example, TOF sensor) and a thermo-hygro sensor. The controller controls an air volume or a wind speed of the tornado fan based on detection information of the sensor. Thus, by perform a feedback control of the air volume or the wind speed of the tornado fan using the detection information of the sensor, the floating state of the float body can be easily kept. In the control of the tornado fan, the air volume or the wind speed of the tornado fan may be controlled by setting a specific condition or a threshold value to the state of the float body, or a known machine learning algorithm, such as a deep learning and a reinforcement learning, can be used.

The presentation system according to the present invention preferably further includes a projector that projects an image light on the float body (for example, bubble and its aggregate). Thus, by projecting the image light on the float body in the proximity of the center in the presentation space in real-time, an innovative video effect can be provided to audience.

A second aspect of the present invention is a presentation method. The presentation method according to the present invention includes a step of blowing an air in a constant direction by each of a plurality of blowers such that a clockwise or counterclockwise vortex air flow is generated in plan view in a presentation space surrounded by exhaust ports of the plurality of blowers; and a step of supplying a float body in the presentation space.

Advantageous Effects of the Invention

According to the present invention, the innovative presentation system and presentation method sufficiently using the characteristics of the float body such as a bubble having a light mass and being floatable can be provided.

DESCRIPTION OF PREFERRED EMBODIMENTS

The following describes embodiments of the present invention using the drawings. The present invention is not limited to the configurations described below, but includes those appropriately changed from the configurations below by a person skilled in the art within an obvious range. In this application, contents of the present invention will be specifically described with a bubble presentation system as an example of a preferred embodiment of the present invention. However, the range of the present invention widely covers devices configured to supply a float body in a presentation space. An example of the float body is an object having a property (temporariness) of disappearing over time (including becoming invisible to human), such as a bubble, a mist (fog), water vapor, a cloud, and a smoke.

Figure 1:
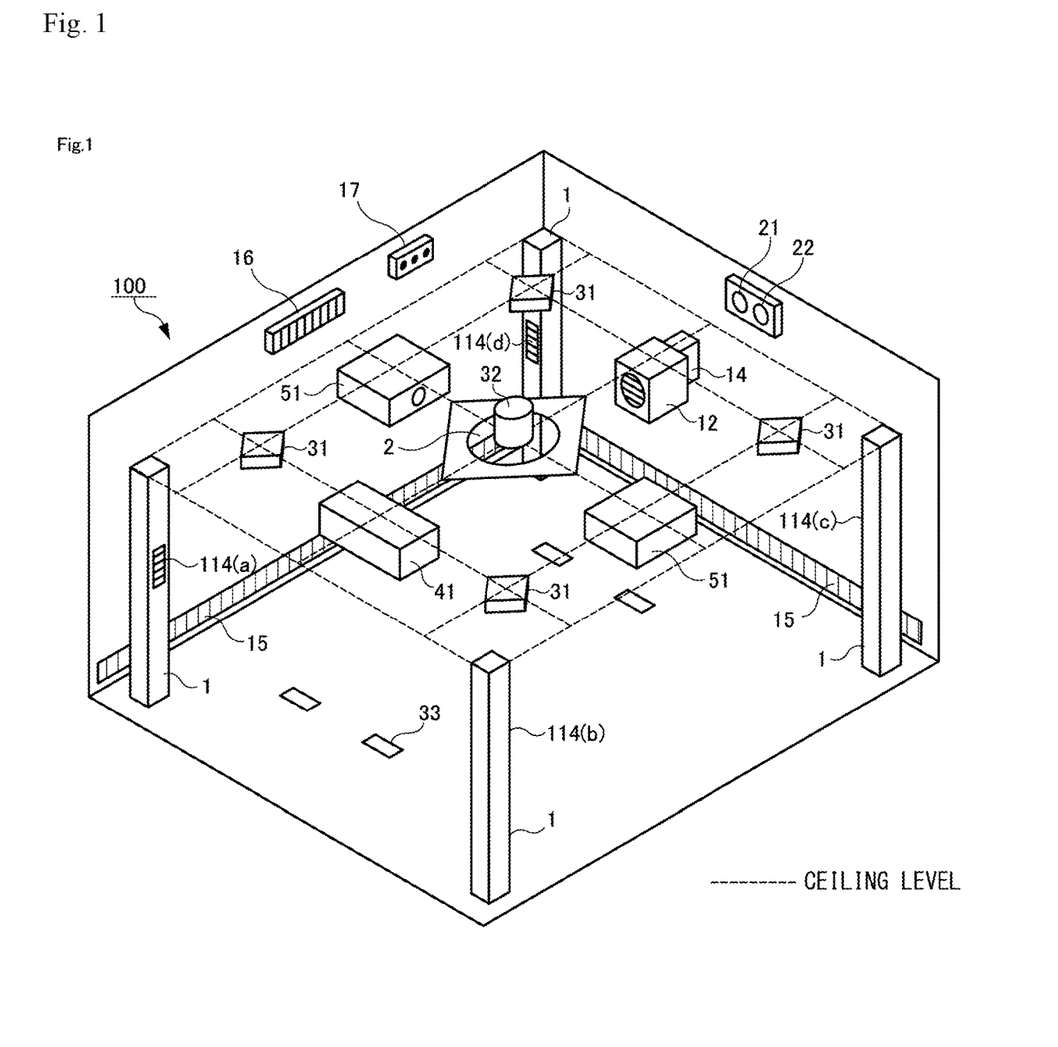
FIG. 1 is a perspective view schematically illustrating an exemplary arrangement of devices each constituting a bubble presentation system according to one embodiment of the present invention.
Figure 2:
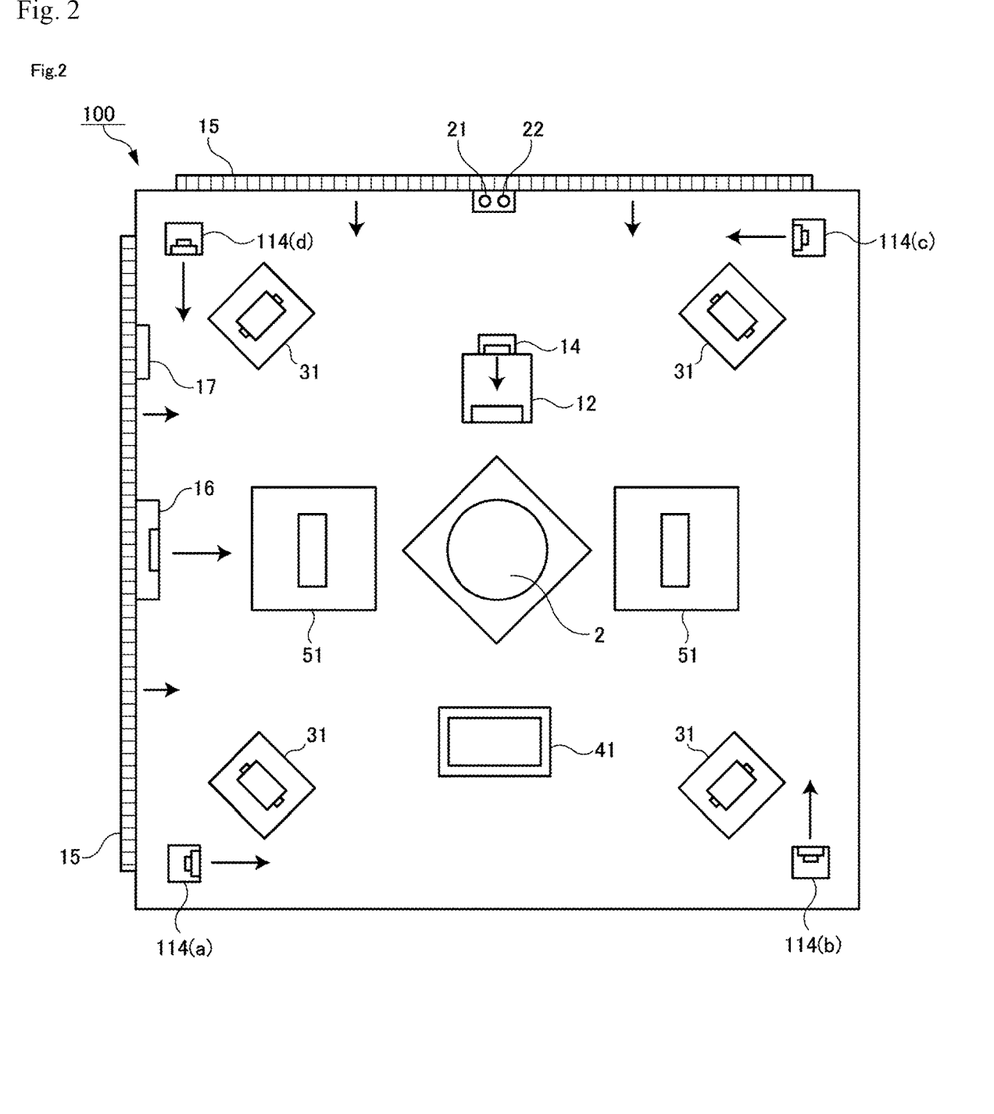
FIG. 2 is a plan view schematically illustrating an exemplary arrangement of the devices each constituting the bubble presentation system and examples of air discharge directions from respective fans at a ceiling level illustrated in FIG. 1.
Figure 3:
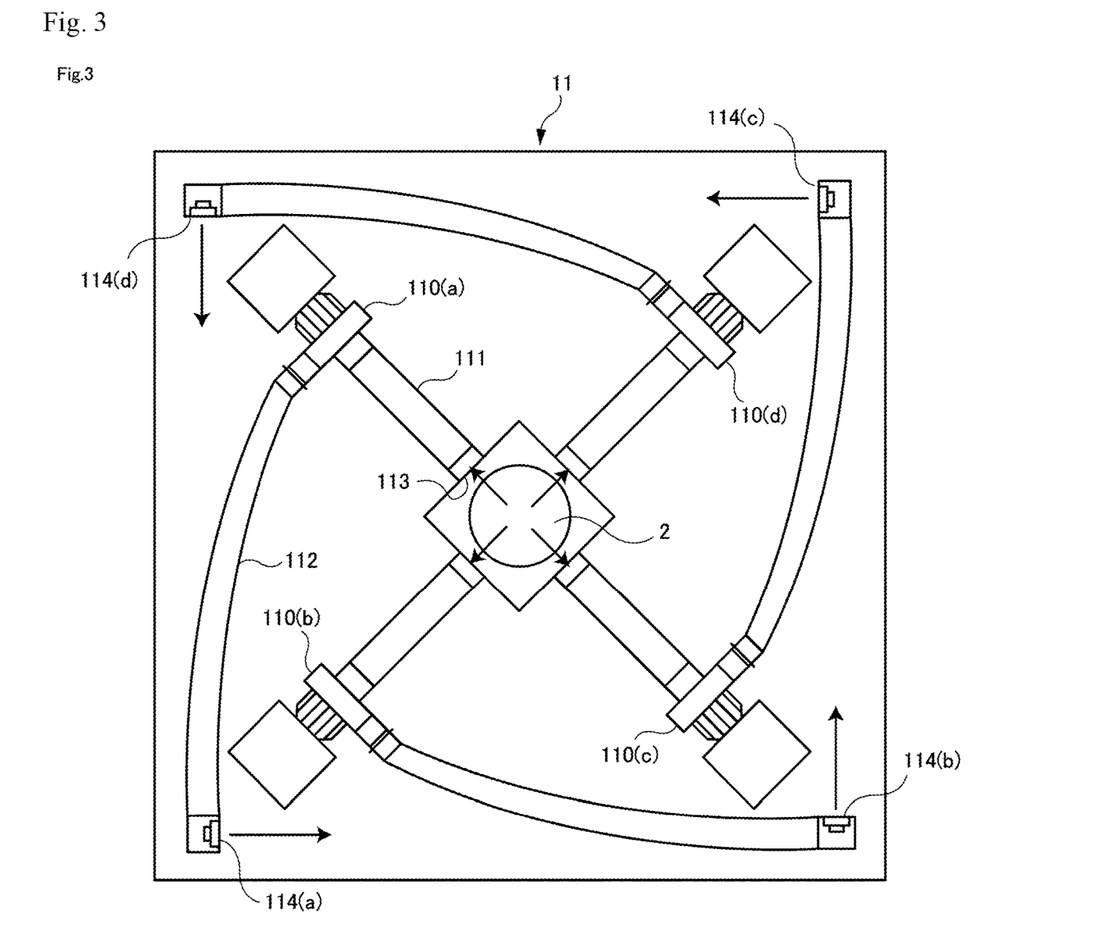
FIG. 3 is a plan view schematically illustrating an exemplary configuration of a tornado fan.
Figure 4:
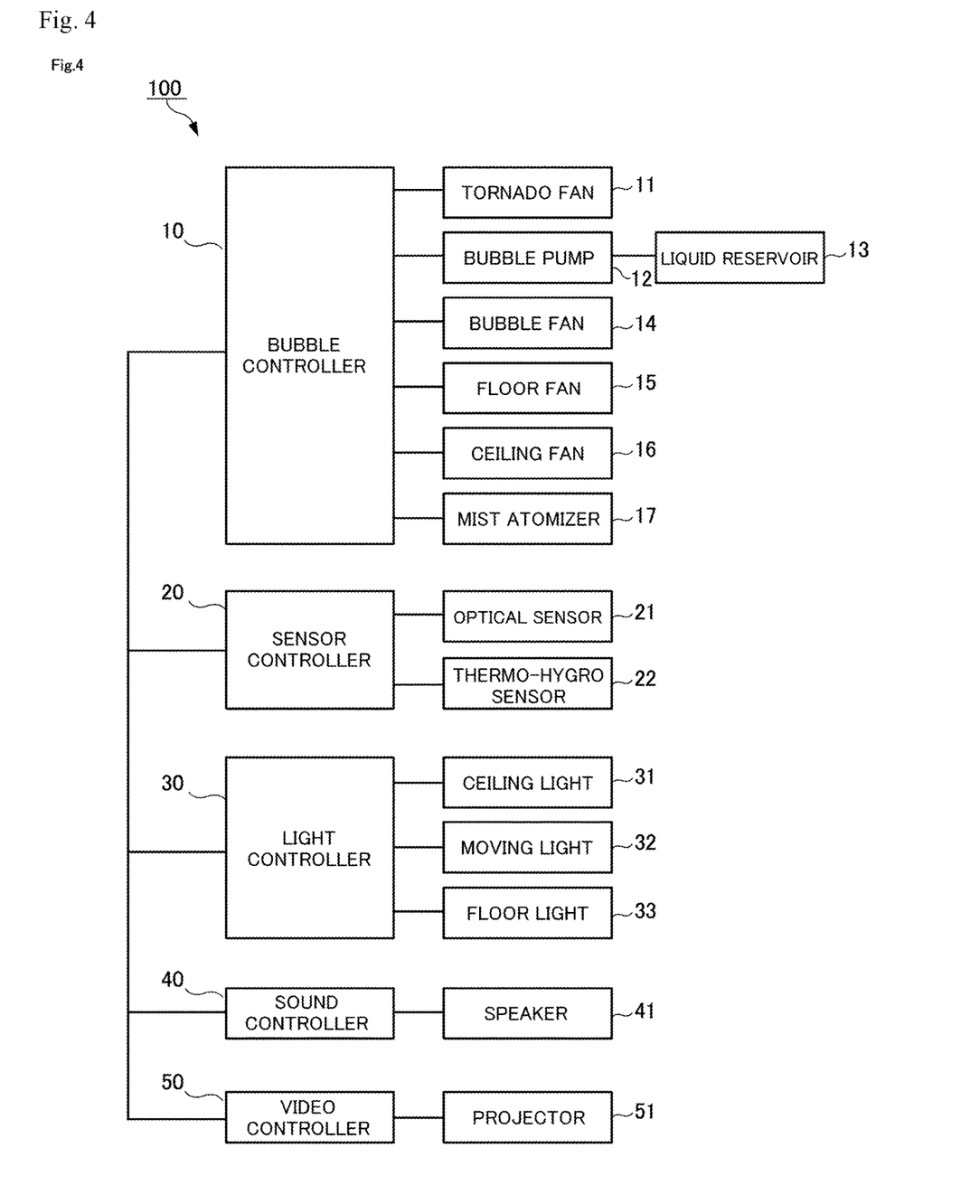
FIG. 4 is a block diagram illustrating examples of devices each constituting the bubble presentation system.
Figure 5:
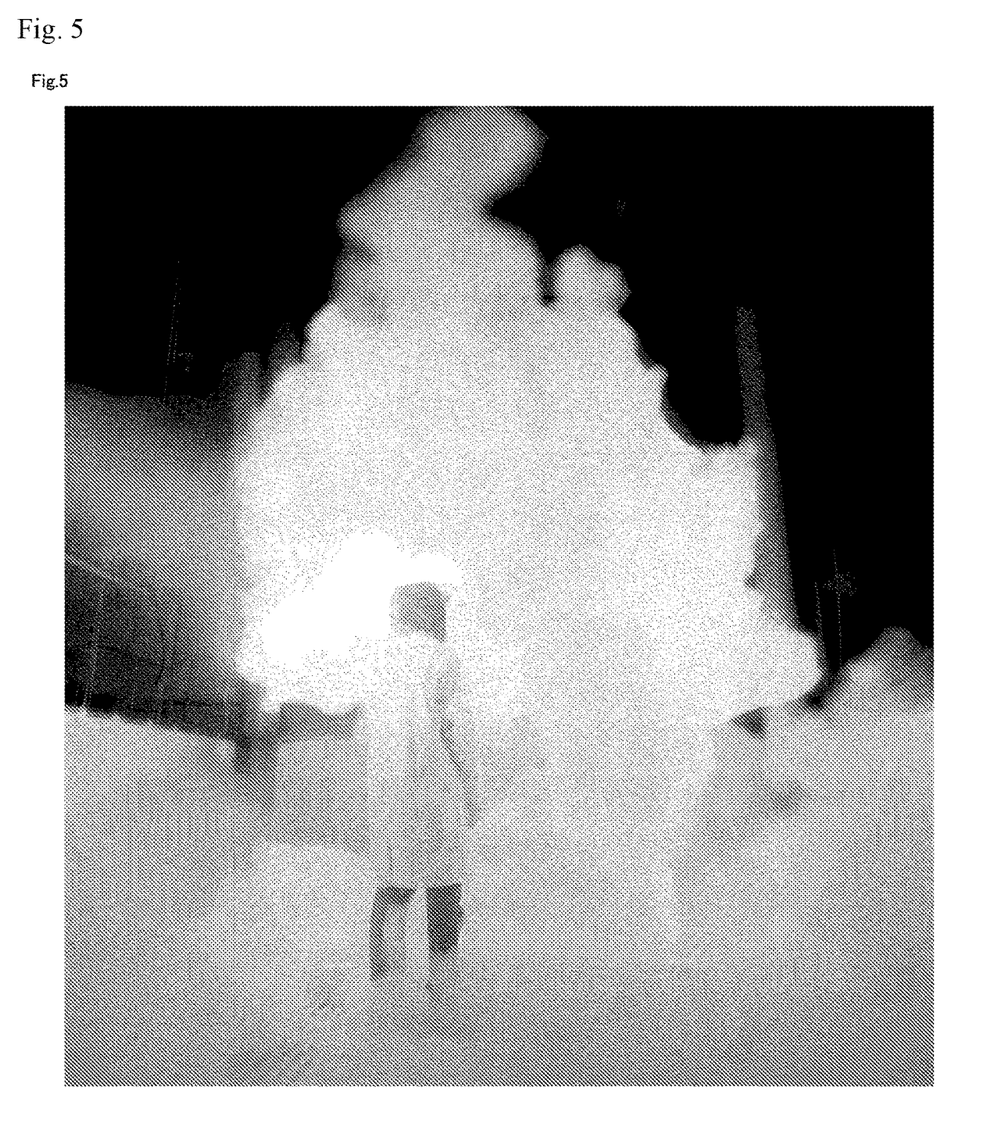
FIG. 5 is a photograph illustrating a state where an aggregate of bubbles (bubble cloud) is actually generated.

FIG. 1 is a perspective view illustrating an outline of a bubble presentation system 100, and mainly illustrates an arrangement of devices each arranged in the vicinity of a ceiling (ceiling level) of a room in which the system is installed. It is not necessarily required to align all heights from a floor surface of the respective devices positioned at the ceiling level, and there is no problem even when the height positions are shifted up and down. FIG. 2 is a plan view illustrating the outline of the bubble presentation system 100, and mainly illustrates the arrangement of the devices, and air discharge directions of respective fans. FIG. 3 is an exemplary configuration of a tornado fan 11 in the bubble presentation system 100. The tornado fan 11 illustrated in FIG. 3 is basically disposed above the ceiling level illustrated in FIG. 1 and FIG. 2, and therefore, not illustrated in FIG. 1 and FIG. 2. The block diagram illustrated in FIG. 4 indicates the devices each included in the bubble presentation system 100 like a list. FIG. 5 illustrates an actual state where an aggregate of bubbles generated by the bubble presentation system 100 is floating in a presentation space.

The bubble presentation system 100 according to the present invention is basically configured to float the aggregate of bubbles in an indoor presentation space. The bubble presentation system 100 controls an air flow inside the presentation space by various kinds of fans such as the tornado fan 11. It is preferred that the air flow inside the space is restricted by a wall, a partition, or an air shower, which are not illustrated, so as to avoid an air other than the air supplied by the various kinds of fans included in the bubble presentation system 100 from flowing in the presentation space. The presentation space has a degree of volume (lateral width, depth, and height) that allows a human to enter there. For example, the lateral width, the depth, and the height of the presentation space are each preferably at least 2 m to 5 m or more, and the volume larger than it also can be ensured.

As illustrated in FIG. 1, in this embodiment, the presentation space is assumed to be a planar rectangular shape (especially, planar square shape), and air pillars 1 as pillars for discharging air are disposed upright at four corners in the presentation space. The four air pillars 1 include respective exhaust ports 114 of blowers 110 included in the tornado fan 11, and the air blown by the blowers 110 is discharged from the exhaust ports 114 disposed at the air pillars 1. As illustrated in FIG. 1 to FIG. 3, four exhaust ports 114(a) to 114(d) disposed at the respective four air pillars 1 have the air discharge directions of the respective exhaust ports 114(a) to 114(d) set so as to generate a clockwise or clockwise vortex air flow in the presentation space in plan view. Specifically, in the example illustrated in FIG. 2, the first exhaust port 114(a) discharges the air in a direction toward the second exhaust port 114(b), the second exhaust port 114(b) discharges the air in a direction toward the third exhaust port 114(c), the third exhaust port 114(c) discharges the air in a direction toward the fourth exhaust port 114(d), and the fourth exhaust port 114(*d*) discharges the air in a direction toward the first exhaust port 114(*a*). Obviously, the discharge directions of the respective exhaust ports 114(*a*) to 114(*d*) can be set to opposite directions of the directions illustrated in FIG. 2. Thus, by setting the air discharge directions of the respective exhaust ports 114(*a*) to 114(*d*), the vortex air flow is generated in the presentation space.

A suction port 2 that suctions the air discharged from each exhaust port 114 is disposed above near the center of the presentation space. The suction port 2 is disposed in the proximity of the ceiling of the presentation space, and for example, only needs to have a height from the floor surface to the suction port 2 of 2 m to 10 m. As illustrated in FIG. 1, in this embodiment, the exhaust ports 114 are disposed at middle portions of the respective air pillars 1. For example, the heights from the floor surface to the respective exhaust ports 114 are 0.5 m to 1 m or more, and the positions are set to be lower than the above-described suction port 2 by 1 m to 2 m or more. Therefore, when the air discharged from each exhaust port 114 is suctioned by the suction port 2, a tornado-like rising air flow can be generated in the presentation space surrounded by the exhaust ports 114.

FIG. 3 illustrates a detailed structure of the tornado fan 11. Components of the tornado fan 11 are basically arranged above the ceiling level illustrated in FIG. 1 and FIG. 2 excluding the above-described exhaust ports 114. As illustrated in FIG. 3, the tornado fan 11 is configured to include a plurality of blowers 110. In this embodiment, since the air pillars 1 as pillars for discharging the air are disposed at four corners of the presentation space as described above, four blowers 110 are prepared as well. Flexible air intake duct 111 and exhaust duct 112 are connected to each blower 110, the air intake duct 111 includes an air intake port 113, and the exhaust duct 112 includes an exhaust port 114. That is, the air suctioned from the air intake port 113 is supplied to the blower 110 via the air intake duct 111. The blower 110 discharges the air suctioned from the air intake port 113 from the exhaust port 114 via the exhaust duct 112 by a rotation of a motor or the like. In this embodiment, first to fourth blowers 110(*a*) to 110(*d*) are configured to discharge the air from the above-described first to fourth exhaust ports 114(*a*) to 114(*d*), respectively.

As illustrated in FIG. 3, the air intake ducts 111 connected to the respective blowers 110(*a*) to 110(*d*) include the respective air intake ports 113 arranged at a peripheral area of the suction port 2 positioned above the center of the presentation space. Therefore, the blowers 110 each suction the air, thereby introducing the air inside the presentation space to the suction port 2. That is, the blowers 110(*a*) to 110(*d*) are each configured to suction the air from the suction port 2 above the center of the presentation space by the air intake port 113, and discharge the air suctioned there from the exhaust port 114 to the four corners of the presentation space. Therefore, an amount of the air suctioned from the presentation space by the blowers 110(*a*) to 110(*d*) is approximately the same as an amount of the air discharged in the presentation space by the blowers 110(*a*) to 110(*d*). Thus, the air in the presentation space is circulated by the air suction function and the air discharge function of the blowers 110. At this time, the tornado-like rising air flow can be generated in the presentation space.

As illustrated in FIG. 1 and FIG. 2, a bubble pump 12 is installed at the ceiling level of the room including the presentation space. The bubble pump 12 is a device configured to generate a large amount of bubbles using a soap liquid reserved in a liquid reservoir 13 (see FIG. 4). The liquid reservoir 13 may be disposed outside the room. For example, the bubble pump 12 generates the bubbles by mixing air in the soap liquid supplied from the liquid reservoir 13 and extruding the gas-liquid mixture through a filter with fine mesh, such as a mesh, while applying a pressure to the gas-liquid mixture. The bubble pump 12 may be configured to generate the bubbles by stirring the soap liquid by a fan or the like, or another known configuration may be employed. A bubble fan 14 configured to blow the large amount of bubbles generated by the bubble pump 12 to the presentation space surrounded by the exhaust ports 114 of the blowers 110 is disposed in or in the proximity of the bubble pump 12. The bubbles generated by the bubble pump 12 reach inside the presentation space on the wind blown from the bubble fan 14. Then, the bubbles float on the air flow in the presentation space. By disposing the bubble pump 12 at the ceiling level, the bubbles generated by the bubble pump 12 falls from the upper side of the presentation space at first. By generating the bubbles in the upper side of the presentation space as described above, the bubbles are easily floated in this space.

A floor fan 15 is disposed in the proximity of the floor surface of the room including the presentation space. The floor fan 15 includes an exhaust port in the proximity of the floor surface of the presentation space, and blows air from the exhaust port toward the presentation space in a direction along the floor surface. For example, the exhaust port of the floor fan 15 is disposed at a wall surface of the room including the presentation space, and the air is blown from the exhaust port to be parallel to the floor surface. The exhaust port of the floor fan 15 is preferably disposed, for example, at a height within 1 m or within 2 m from the floor surface, and especially preferably at a height within 0.7 m or within 0.5 m. As illustrated in FIG. 1 and FIG. 2, the exhaust port of the floor fan 15 preferably extends horizontally long between the mutually adjacent two air pillars 1. For example, when a distance between the mutually adjacent two air pillars 1 is 100%, a length of the exhaust port of the floor fan 15 is preferably 80% or more or 100% or more. Thus, by generating the air flow parallel to the floor surface by the floor fan 15, the aggregate of bubbles floating in the presentation space becomes to be less likely to attach to the floor surface. Accordingly, the aggregate of bubbles becomes to be easily pulled up from the floor surface to keep the floating state.

A ceiling fan 16 is further disposed in the proximity of the ceiling of the room including the presentation space. The ceiling fan 16 includes an exhaust port in the upper side of the presentation space, and blows air toward the suction port 2. For example, the exhaust port of the ceiling fan 16 is disposed at a wall surface of the room including the presentation space, and the air is blown from the exhaust port along the ceiling surface of the room. Thus, by generating the air flow parallel to the ceiling surface toward the suction port 2 by the ceiling fan 16, the tornado-like air flow formed in the presentation space by the air blowing effect of the tornado fan 11 can be broken in the proximity of the suction port 2. Accordingly, the bubbles inside the presentation space can avoid being suctioned in the suction port 2 on the tornado-like air flow.

A mist atomizer 17 is further disposed in the room including the presentation space. The mist atomizer 17 atomizes a mist to increase a humidity inside the presentation space. This allows increasing the sustainability of the bubbles floating inside the presentation space. As described below, while a presentation in which the presentation space is internally illuminated by various kinds of illumination devices is performed in this system, supplying the mist in the presentation space can provide a fantastical illumination effect.

The bubble presentation system 100 further includes sensors 21, 22 for detecting a state of the presentation space and a state of the aggregate of bubbles. In this embodiment, an optical sensor 21 and a thermo-hygro sensor 22 are employed. As illustrated in FIG. 4, detection information obtained by the sensors 21, 22 is input to a sensor controller 20 configured by a known PC or the like. An exemplary optical sensor 21 is a Time Of Flight (TOF) sensor. Specifically, the optical sensor 21 performs a pulse emission of a laser light, such as an infrared light, from a light emitting element, and measures a time period until the laser light returns to a light receiving element after being reflected by an object (aggregate of bubbles). The sensor controller 20 can calculate a distance from the sensor to the object and a coordinate value of the object in the presentation space based on the time period measured by the optical sensor 21. Thus, by emitting the laser light from the optical sensor 21 to the whole aggregate of bubbles, coordinate information on a contour of the aggregate of bubbles in the presentation space can be obtained. Accordingly, the floating state of the bubbles and the volume of the aggregate of bubbles can be estimated. The thermo-hygro sensor 22 measures a temperature and/or a humidity inside the room including the presentation section space. Specifically, since the sustainability of the bubbles increases as the humidity inside the room increases, measuring the humidity inside the room is effective for estimating the sustainability of the bubbles.

The detection information of the sensors 21, 22 are used for controlling the bubbles. As illustrated in FIG. 4, the sensor controller 20 transmits the detection information of the sensors 21, 22 and information obtained by performing a predetermined arithmetic operation based on the detection information to a bubble controller 10 via a main bus. The bubble controller 10 is a PC in which a bubble control program is installed, connected to the tornado fan 11, the bubble pump 12, the bubble fan 14, the floor fan 15, the ceiling fan 16, and the mist atomizer 17, and controls each of the devices. Specifically, the bubble controller 10 controls air volume or a wind speed (hereinafter referred to as the air volume or the like) for the various kinds of fans 11 and 14 to 16, controls a bubble generation amount for the bubble pump 12, and controls an amount of atomizing the mist for the mist atomizer 17. The bubble controller 10 controls the devices 11 to 17 based on, for example, the detection information of the optical sensor 21 and the thermo-hygro sensor 22 such that the aggregate of bubbles continues floating in the presentation space.

Examples of the control method by the bubble controller 10 include preliminarily programing conditions under which the devices 11 to 17 operate in the bubble controller 10 in conjunction with the coordinate value of the aggregate of bubbles, the volume value of the aggregate of bubbles, or the humidity value inside the presentation space. For example, when the coordinate position of the aggregate of bubbles approaches the floor surface, the air volume or the like of the tornado fan 11 and/or the floor fan 15 is increased to lift the aggregate of bubbles upward. When the coordinate position of the aggregate of bubbles approaches the suction port 2, it is only necessary to decrease the air volume or the like of the tornado fan 11 or increase the air volume or the like of the ceiling fan 16, thereby avoiding the bubbles from being suctioned in the suction port 2. When the volume of the aggregate of bubbles is decreased, it is only necessary to increase the bubble generation amount of the bubble fan 14, decrease the air volumes or the like of the fans 11 and 14 to 16 to make the bubbles less likely to be broken by the wind, or increase the amount of atomizing the mist by the mist atomizer 17 to increase the sustainability of the bubbles. When the volume of the aggregate of bubbles is excessively increased, the control opposite to the above is performed. Since the decrease of the sustainability of the bubbles is concerned when the humidity inside the presentation space is decreased, it is only necessary to increase the amount of atomizing the mist by the mist atomizer 17.

The control processing by the above-described bubble controller 10 can be achieved by using a machine learning such as an artificial neural network (deep learning and the like) and a reinforcement learning. For example, the deep learning is performed using a data set of the operations of the various kinds of devices 11 to 17 and the behaviors of the bubbles by the operations as teacher data, and a learned model obtained as its result can be used for the control processing by the bubble controller 10. Accordingly, by referring to the learned model, the various kinds of devices 11 to 17 can be efficiently operated depending on the behavior of the bubbles so as to optimize the volume and the floating state of the bubbles. When the reinforcement learning is performed, it is only necessary to control the various kinds of devices 11 to 17 so as to maximize a reward or minimize a penalty by giving a reward to an environment in which the volume of the aggregate of bubbles is within an appropriate range and its floating state is kept or giving a penalty to an environment in which the volume of the aggregate of bubbles is out of the appropriate range or the aggregate of bubbles is attached to the floor surface or the ceiling. Thus, by using the machine learning, the behavior of the aggregate of bubbles complicatedly changing depending on the environment inside the presentation space can be efficiently optimized.

The presentation system 100 further includes various kinds of lights 31 to 33 for illuminating the presentation space or the aggregate of bubbles. Ceiling lights 31 are disposed near the ceiling (ceiling level) of the room including the presentation space. A moving light 32 is disposed above the center of the presentation space, positioned above the suction port 2 in the example illustrated in FIG. 1, and irradiates the aggregate of bubbles with an illuminating light through the suction port 2. Floor lights 33 are disposed on the floor surface of the room including the presentation space. The lights 31 to 33 are connected to a light controller 30 configured by a known PC or the like. The light controller 30 controls light amounts (brightness), light colors, and blinking of the illuminating lights of the respective lights 31 to 33. Especially, the light controller 30 can control the irradiation direction of the light for the moving light 32. Specifically, the light controller 30 only needs to receive the coordinate information on the contour of the aggregate of bubbles from the sensor controller 20 via the main bus and control the irradiation direction of the moving light 32 based on the coordinate information. For example, the irradiation direction of the moving light 32 can be controlled so as to irradiate the aggregate of bubbles with the light. Accordingly, even the aggregate of bubbles whose shape and position change in real-time can be appropriately illuminated.

The presentation system 100 further includes a speaker 41 in the room including the presentation space. Especially, in the example illustrated in FIG. 1, the speaker 41 is disposed near the ceiling (ceiling level) of the room. The speaker 41 is connected to a sound controller 40 configured by a known PC or the like. The sound controller 40 controls acoustic effects of a BGM, a sound effect, and the like emitted from the speaker 41. The sound controller 40 may receive the detection information or the like of the sensors 21, 22 from the sensor controller 20 via the main bus and control the sound output from the speaker 41 based on the detection information. For example, the sound can be changed depending on the position and the volume of the aggregate of bubbles in the presentation space.

The presentation system 100 further includes projectors 51 configured to project image lights on the aggregate of bubbles. In the embodiment illustrated in FIG. 1 and FIG. 2, the two projectors 51 are disposed at symmetrical positions across the center of the presentation space. Therefore, the image lights can be projected on the aggregate of bubbles gathering in the proximity of the center in the presentation space from both right and left sides by the two projectors 51. Accordingly, the image lights can be projected on approximately the whole of the aggregate of bubbles. The number of the projectors 51 can be appropriately increased/decreased in consideration of, for example, the size of the presentation space and the assumed size of the aggregate of bubbles. As illustrated in FIG. 1, each of the projectors 51 only need to be disposed in the proximity of the ceiling of the room including the presentation space. Each of the projectors 51 is connected to a video controller 50 configured by a known PC or the like, and projects the image light on the aggregate of bubbles in accordance with the control by the video controller 50.

The video controller 50 controls each of the projectors 51 to perform what is called a projection mapping on the aggregate of bubbles. The video controller 50 stores a CG video and the like to be projected on the aggregate of bubbles, and projects the video from each of the projectors 51. The video controller 50 obtains the coordinate information on the contour of the aggregate of bubbles from the sensor controller 20 via the main bus. The video controller 50 changes the video projected from each of the projectors 51 in real-time, and controls the projection direction of the image light based on the coordinate information of the aggregate of bubbles. For example, the video controller 50 may change a content and a light color of the video to be projected on the aggregate depending on the size, the shape, or the floating position of the aggregate of bubbles. Accordingly, an effective projection mapping can be performed on the aggregate of bubbles floating in the presentation space as a projection plane.

FIG. 1 and FIG. 2 schematically illustrate one presentation space and one system 100 for forming the aggregate of bubbles there. However, a plurality of the presentation spaces may be formed in one room by disposing a plurality of the systems 100 arranged in the same room.

FIG. 5 illustrates a state where an aggregate of bubbles is actually floated in a room and the aggregate is illuminated. As illustrated in FIG. 5, according to the bubble presentation system 100 of the present invention, since the aggregate of bubbles can be actually floated in the presentation space, a human can enter there. Thus, the bubble easily floats because of its light mass, and has a characteristic of forming an aggregate like a cloud. The system 100 according to the present invention can provide an innovative presentation effect effectively using the above-described characteristic of the bubble by artificially generating a tornado-like rising air flow in the presentation space and floating the bubbles on the air flow.

In this application, the embodiments of the present invention have been described above by referring to the drawings to express the contents of the present invention. However, the present invention is not limited to the embodiments described above, but includes changed configurations and improved configurations obvious to those skilled in the art based on the matters described in this application.

INDUSTRIAL APPLICABILITY

The present invention relates to a bubble presentation system and a bubble presentation method allowing an aggregate of bubbles to float in midair. Accordingly, the present invention can be appropriately applicable to the entertainment industry and the advertising industry.

DESCRIPTION OF REFERENCE SIGNS

| | | | |
|---|---|---|---|
| 1 | air pillar | 2 | suction port |
| 10 | bubble controller | 11 | tornado fan |
| 12 | bubble pump (supply device) | 13 | liquid reservoir |
| 14 | bubble fan | 15 | floor fan |
| 16 | ceiling fan | 17 | mist atomizer |
| 20 | sensor controller | 21 | optical sensor |
| 22 | thermo-hygro sensor | 30 | light controller |
| 31 | ceiling light | 32 | moving light |
| 33 | floor light | 40 | sound controller |
| 41 | speaker | 50 | video controller |
| 51 | projector | 100 | bubble presentation system |
| 110 | blower | 111 | air intake duct |
| 112 | exhaust duct | 113 | air intake port |
| 114 | exhaust port | | |

The invention claimed is:

1. A presentation system comprising:
   a tornado fan that includes a plurality of blowers, wherein the tornado fan is configured so that each of the plurality of blowers blows air so as to generate a clockwise or counterclockwise air flow in plan view in a presentation space surrounded by exhaust ports of the plurality of blowers;
   a suction port suctioning the air blown by the tornado fan in an upper side of the presentation space;
   flexible air intake ducts and flexible exhaust ducts that are connected to the plurality of blowers, respectively; and
   a supply device that supplies a float body in the presentation space, wherein
   the air intake ducts include air intake ports,
   the exhaust ducts include the exhaust ports,
   the air suctioned from the air intake ports is supplied to the plurality of blowers via the air intake ducts,
   the plurality of blowers discharge the air suctioned from the air intake ports from the exhaust ports via the exhaust ducts, and
   the air intake ports are arranged at a peripheral area of the suction port.

2. The presentation system according to claim 1, wherein the supply device is a bubble pump that supplies bubbles in the presentation space.

3. The presentation system according to claim 1, further comprising
   a ceiling fan that includes an exhaust port disposed in an upper side of the presentation space and blows air toward the suction port.

4. The presentation system according to claim 1, further comprising
   a floor fan that includes an exhaust port in a proximity of a floor surface of the presentation space and blows air in a direction along the floor surface.

5. The presentation system according to claim 1, wherein the supply device is a mist atomizer that supplies a mist in the presentation space.

6. The presentation system according to claim 1, further comprising:
- a sensor for sensing both or any one of a state of the presentation space and a state of the float body; and
- a controller that controls an air volume or a wind speed of the tornado fan based on detection information of the sensor.

7. The presentation system according to claim 1, further comprising
- a projector that projects an image light on the float body.

8. A presentation method conducted by a presentation system including a plurality of blowers comprising:
- a step of blowing air in a constant direction by each of the plurality of blowers such that a clockwise or counterclockwise air flow is generated in plan view in a presentation space surrounded by exhaust ports of the plurality of blowers; and
- a step of supplying a float body in the presentation space,
- wherein the presentation system further includes a suction port suctioning the air blown by the tornado fan in an upper side of the presentation space,
- characterized that the presentation system further includes flexible air intake ducts and flexible exhaust ducts that are connected to the plurality of blowers, respectively, wherein
- the air intake ducts include air intake ports,
- the exhaust ducts include the exhaust ports,
- the air suctioned from the air intake ports is supplied to the plurality of blowers via the air intake ducts,
- the plurality of blowers discharge the air suctioned from the air intake ports from the exhaust ports via the exhaust ducts, and
- the air intake ports are arranged at a peripheral area of the suction port.

* * * * *